United States Patent
Sedon et al.

[11] Patent Number: 5,931,291
[45] Date of Patent: Aug. 3, 1999

[54] MULTI-MEDIA SHIPPING AND STORAGE CONTAINER

[75] Inventors: Nicholas M. Sedon, Massillon; Ronald K. Burdett, Strasburg, both of Ohio; David P. Ignaczak, Sarver, Pa.

[73] Assignee: Alpha Enterprises, Inc., North Canton, Ohio

[21] Appl. No.: 09/054,932

[22] Filed: Apr. 3, 1998

Related U.S. Application Data

[60] Provisional application No. 60/055,524, Aug. 8, 1997.

[51] Int. Cl.$^6$ .......................... B65D 43/16; B65D 43/22
[52] U.S. Cl. ................. 206/1.5; 206/308.2; 206/387.11; 206/807; 220/266
[58] Field of Search ................................ 206/1.5, 308.1, 206/308.2, 387.11, 807; 220/266, 339; 70/63

[56] References Cited

U.S. PATENT DOCUMENTS

| | | | |
|---|---|---|---|
| 4,011,940 | 3/1977 | Neal et al. ................................. | 206/1.5 |
| 4,531,670 | 7/1985 | Kupersmit ................................. | 206/807 |
| 4,610,371 | 9/1986 | Karkiewicz ............................... | 206/807 |
| 5,033,778 | 7/1991 | Niles et al. ............................... | 206/1.5 |
| 5,219,087 | 6/1993 | Christensson ............................ | 220/266 |
| 5,285,918 | 2/1994 | Weisburn et al. . | |
| 5,551,560 | 9/1996 | Weisburn et al. . | |
| 5,636,737 | 6/1997 | Marsilio . | |
| 5,788,105 | 8/1998 | Foos .......................................... | 206/1.5 |

*Primary Examiner*—Paul T. Sewell
*Assistant Examiner*—Luan K. Bui
*Attorney, Agent, or Firm*—Sand & Sebolt

[57] ABSTRACT

A multi-media shipping container, such as a compact disc or video cassette container, having a base and a lid hingedly connected by a hinge assembly and movable between open and closed positions, whereby the shipping container includes a tear away latching mechanism which when torn away provides a storage container. The latching mechanism is mounted on the container and includes a pair of flexible flaps or strips which are hingedly connected to the base and lid by reduced thickness living hinges. The flaps overlap one another and interengage one another to thereby lock the base and lid together in a tamper proof and pry-resistant manner. The flaps are grasped and pulled outwardly and along the front of the container by a user thereby tearing them away. The reduced thickness living hinges are torn from the container leaving a usual compact disc or VHS video cassette storage container.

12 Claims, 7 Drawing Sheets

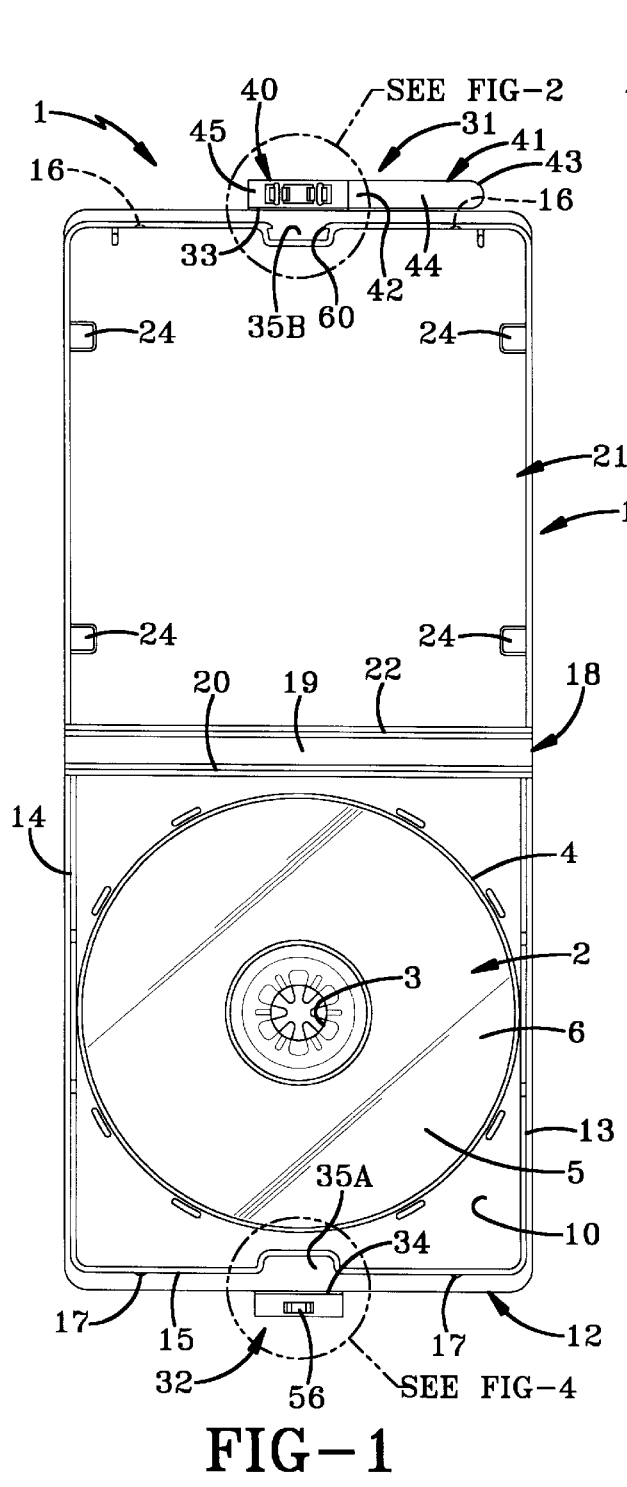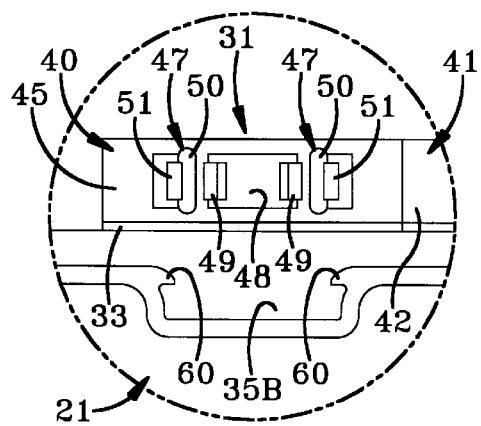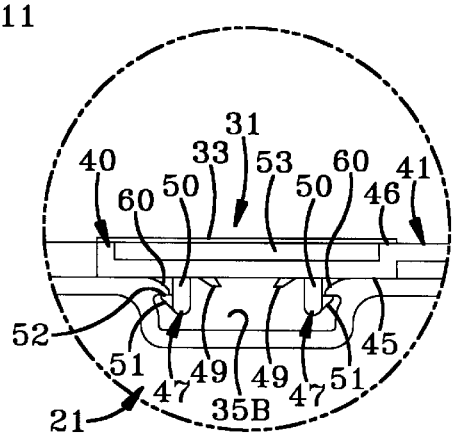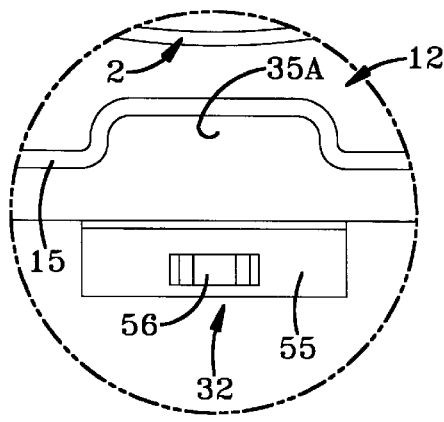

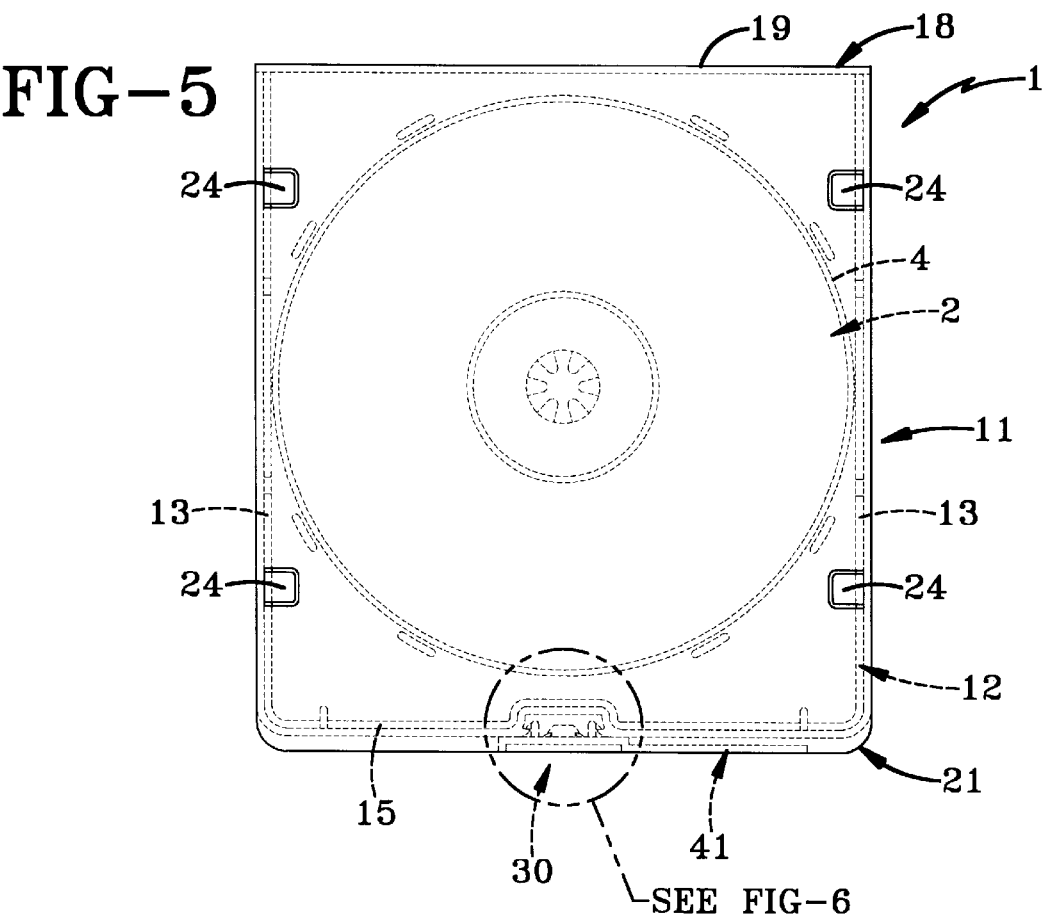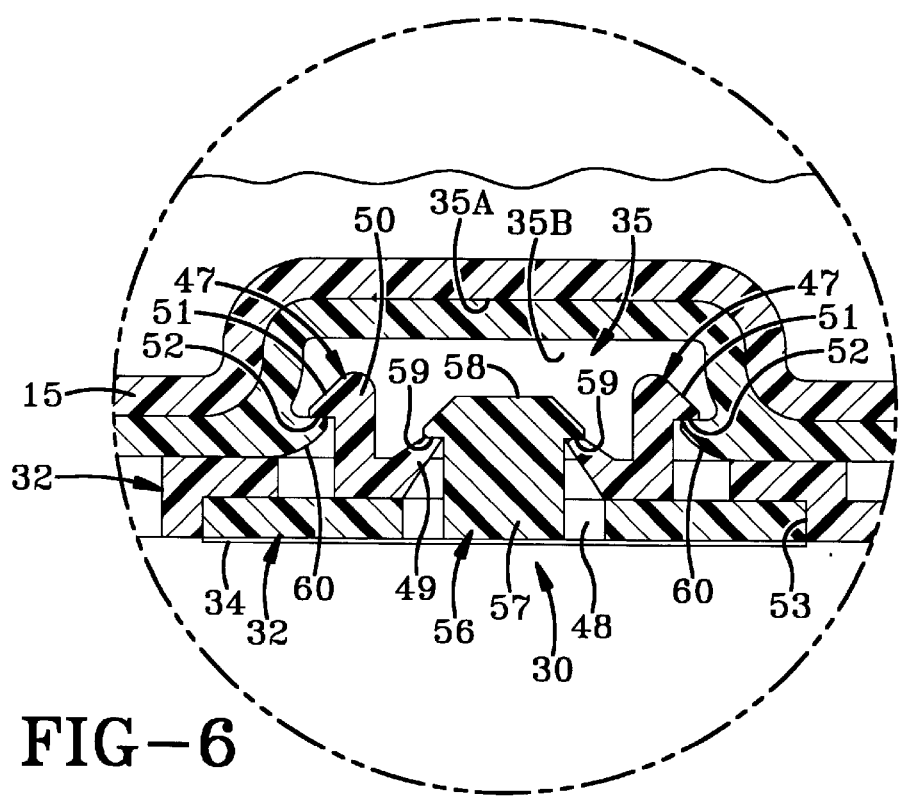

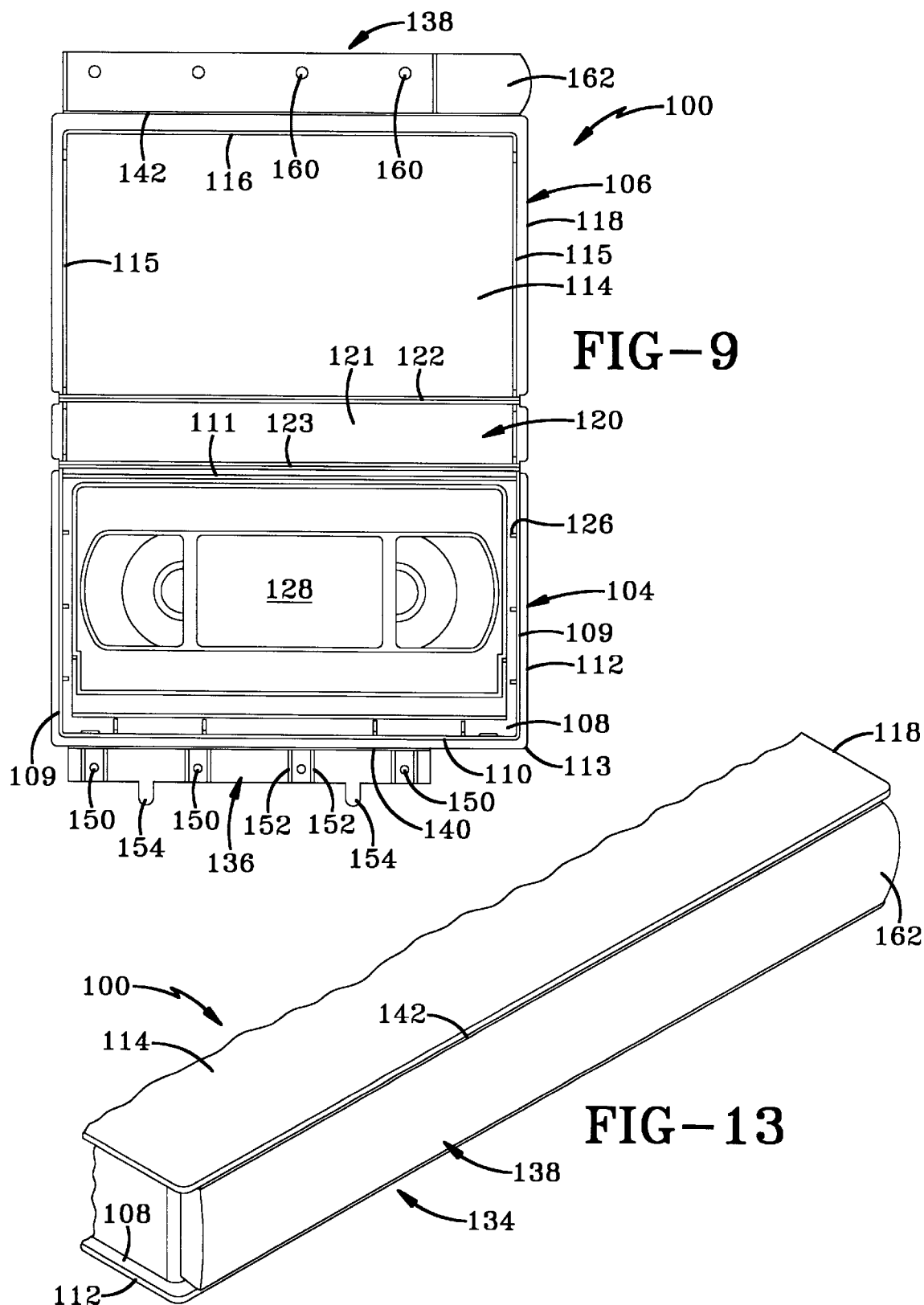

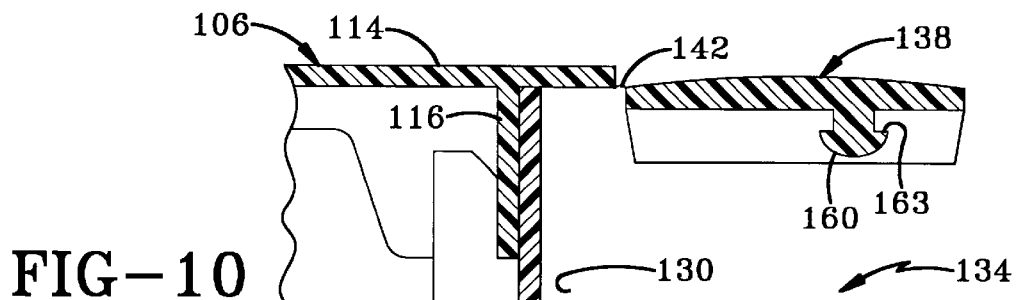
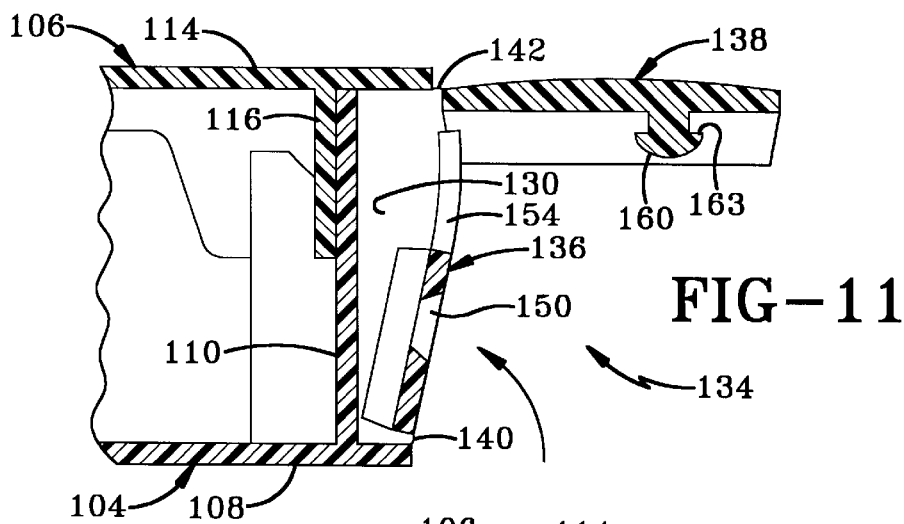
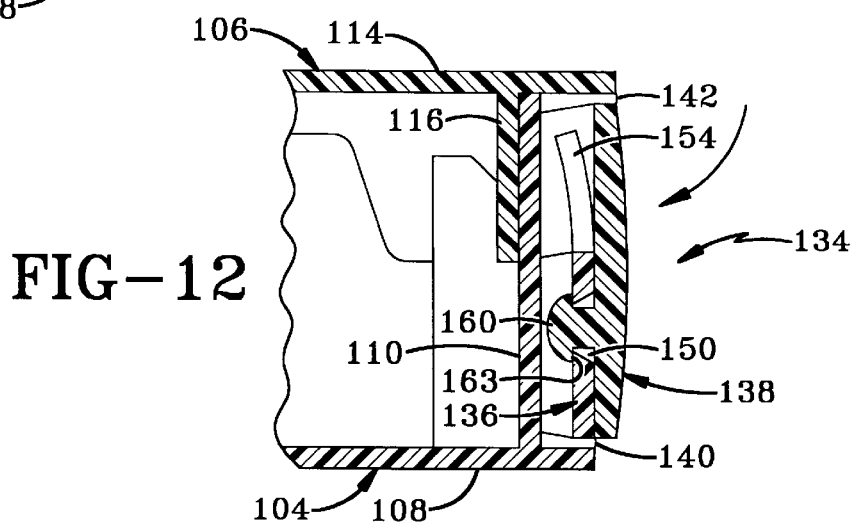

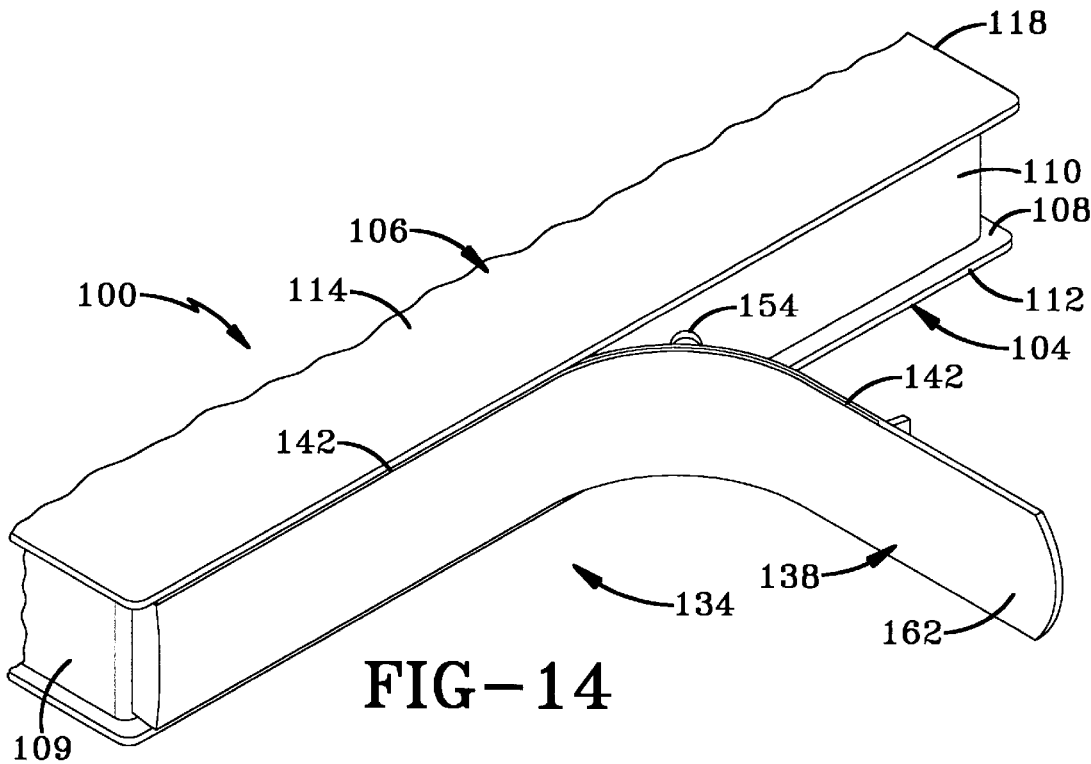
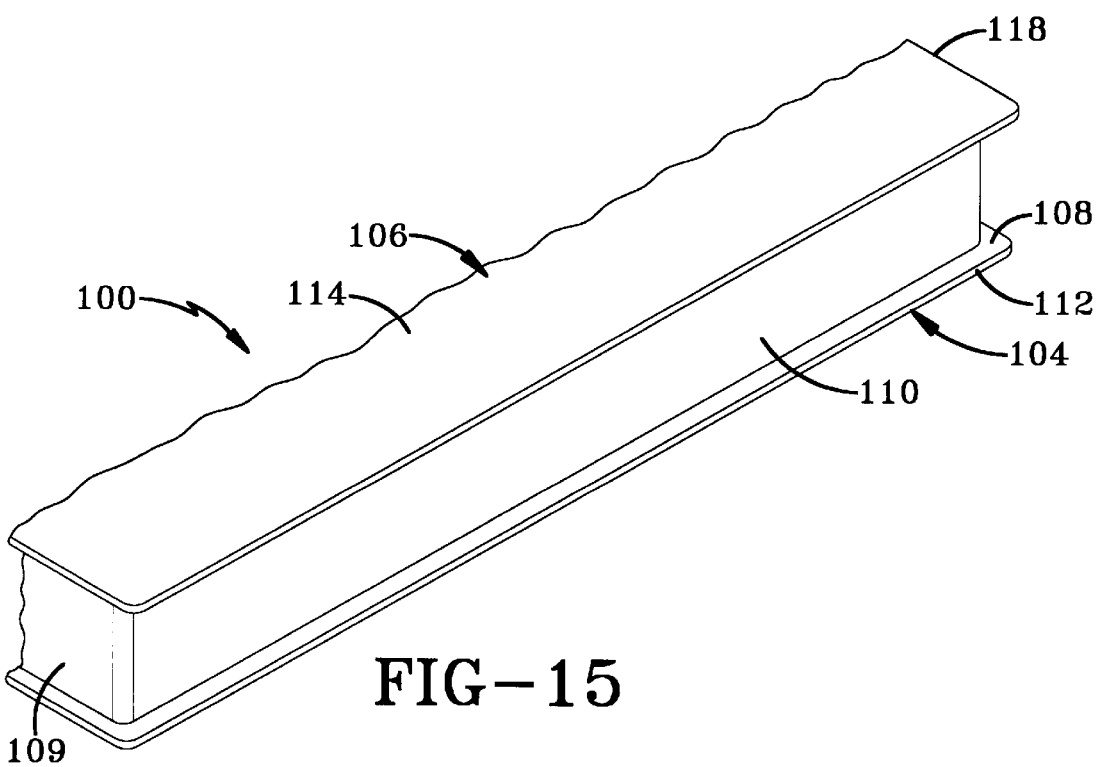

MULTI-MEDIA SHIPPING AND STORAGE CONTAINER

CROSS REFERENCE TO RELATED APPLICATION

This application claims the benefit of U.S. provisional application Ser. No. 60/055,524, filed Aug. 8, 1997.

BACKGROUND OF THE INVENTION

1. Technical Field

The present invention relates to a multi-media container that is usable during both shipping and thereafter for storage. More particularly, the invention relates to a shipping container for multi-media members which contain electronic readable information thereon, such as compact discs (CDS), video cassettes, audio cassettes, optically readable video discs, etc., that, after shipping and opening, transforms into a reusable storage container for the same multi-media members. Specifically, the invention relates to a container with a base and a lid hingedly connected to form a storage receptacle in which the disc, cassette or tape is stored whereby a disposable locking mechanism secures the lid to the base during shipping but is tearable therefrom upon initial opening such that a storage container remains that can be used by the recipient to store the disc, cassette, or tape therein.

2. Background Information

The use of compact discs (CDS), video cassette, audio cassettes, optically readable video discs, and other similar multi-media mediums has grown in almost exponential proportions over the past decade or more. The compact discs are primarily purchased with a program, retrievable information, or data thereon for video and audio use in a computer, or with a pre-recorded movie or audio performance thereon for use in video and audio compact disc players respectfully. In addition, the technology is now generally available to write to compact discs so a market is developing where users record information, performances, programs, etc. on previously blank compact discs. Specifically as to video cassettes, these cassettes are used primarily to record programs directly from a television for replay, or else they are purchased with a program, movie or the like pre-recorded thereon. Similarly, audio cassettes have been used for decades to record performances from radio, other recordings, or live, for later replay, as well as to be purchased with a performance or the like recorded thereon. Finally, of recent other forms of multi-media have become increasingly popular including laser discs or other optically readable video discs which provide the user with a pre-recorded digital version of one or more movies or other programs.

Home shopping and mail order purchasing has become an increasing popular method in the retail industry to both market and sell compact discs (CDS), video cassette tapes, audio cassette tapes, and other forms of multi-media. Home shopping channels, "infomercials", and standard commercials have exploded in growth as a means of marketing and selling various videos, movies and instructional tapes or discs as well as audio tapes or discs recorded on the above described various forms of multi media which consumers often purchase using their telephone and a credit card. The discs and tapes are mailed to the consumer and the consumer's credit card is charged accordingly. Various video and audio clubs market different forms of the performances, movies, programs, or other pre-recorded materials to their club members at a price which is lower than most retail stores. The members choose the performances, movies, programs, or other pre-recorded materials they wish to purchase from a catalog listing and the clubs mail the selections to the club members.

It is therefore desirable that these tapes, discs, or cassettes be shipped and stored in protective boxes or containers to prevent physical damage to them during shipment, as well as to keep them relatively dust free during storage. The ability to keep them dust free and otherwise free from contact to exposed information window is critical to the continued quality of the multi-media. Specifically, the various discs and tapes, usually formed of a synthetic plastic material, such as CDS and video discs as well as video and audio cassettes, contain stored information on one or more surfaces of the discs or tapes. As to the discs, a peripheral edge free of information is supplied, while as to the tapes, a protective housing is supplied. In either the discs or tapes, one or more center holes are generally provided which is utilized when the disc or tape is inserted into a player for retrieving the information stored on the disc or tape surface. Various containers have been developed for storing and displaying these discs and the tape housings which prevent damage to the disc or tape and which eliminate or reduce contact with the information containing areas thereof.

As to the current technology as to storage receptacles, most of these known storage containers support the disc or tape within the container by one or more raised center hubs on either the lid or base of the storage container. As to audio tapes, the container also may include one end of the base defined as a seat or tape receiving slot where the lid then brings the hubs into contact with the tape. However as to video tapes, the containers may include hubs, or alternatively may only be a storage receptacle sized to enclose the tape only.

Examples of known prior art disc storage containers are shown in U.S. Pat. Nos. 5,279,097, 5,259,498, 4,903,829, 4,874,085, 4,613,044, 4,623,062, and 4,084,690. Similarly, examples of known audio cassette storage containers are shown in 5,044,497, 4,928,825, 4,871,064, 4,627,534, 4,184,594, 4,011,940, and 3,876,071. Also, examples of known video cassette storage containers are shown in 5,211, 287, 4,988,000, 4,987,999, and 4,184,594. Although these and other containers do perform satisfactory for their intended purpose, they do not provide adequate receptacles for shipping purposes. As a result, these storage containers are often then packed within a shipping container which is an unnecessary cost and time consuming added process.

One example, of the storage container packed within the shipping container is found in current VHS video tape marketing where the VHS video tapes are packaged in a usual video cassette storage container having a latch to frictionally retain the container in a closed position. The storage container and enclosed VHS tape are then packaged in an outer shipping container and mailed to the consumer. The consumer must open the shipping container to determine if the contents of the package is the same as what he or she ordered. Once the shipping container is opened the consumer has access to the video cassette for viewing or copying.

Most mail order retailers offer a 30-day money back guarantee on their videos. One problem retailers have with this method of selling videos is that once the consumer opens the package and views the video, the purchaser has gained the benefit of enjoying the movie and can return the tape for a refund. Further, the VHS tapes may be copied to blank VHS tapes allowing the purchaser to retain a copy of the video returning the original for a refund. Also, this method of shipping VHS tapes is not economical for the retailer in that the extra material required for the second or outer shipping container and the extra weight that the shipping container adds to the package raises the material costs and the shipping expenses, to mail the VHS tape to the consumer. It is desirable to mail order retailers to ship VHS tapes in a single lightweight shipping container with a locking mechanism which prevents tampering of the tape during shipment and allows the consumer to read the title of the enclosed VHS tape and return the unopened shipping container and enclosed tape for a full refund. The shipping container must also provide a usable VHS storage container in which the consumer can store the tape during everyday use.

The computer and audio compact disc, laser disc, audio cassette and other multi-media markets are similarly situated in that it would be very desirable to combine a shipping and storage container which prevents tampering and is economical to produce. Therefore, the need exists for an improved multi-media storage container which is modifiable for compact discs, audio cassettes, video cassettes, and other forms which securely holds the disc within the container for shipping, which readily transforms into a storage container, which is economical to produce, which is simple to assemble, which is lightweight, and which has many other positive attributes and overcomes many negative attributes as described below in the summary and objectives, the detailed description, the claims, and as is known in the art by those skilled in the art.

In addition, as new videos and compact discs are released, the video and music rental stores buy a predetermined set amount of copies for the rental pleasure of its customers. Since the quantity ordered is almost always determined prior to knowledge of the rental demand, the stores must guess as to expected demand since once a video or compact disc is opened, the store must purchase it. Thus, an additional need exists for a shipping container that clearly is tamper proof whereby a surplus may be ordered by these stores since unopened videos and tapes may be returned where the shipping container has clearly never been opened.

SUMMARY OF THE INVENTION

Objectives of the present invention include providing an improved multi-media shipping and storage container which may be used both for the purpose of shipping a cassette to a customer, as well as for providing the usual storage case for the cassette upon receipt by the customer.

A further objective of the invention is to provide such a storage/shipping container which is permanently locked during shipping, and which is securely latched for shipping by an easily engageable snap-fit latching mechanism that is transformable into an easy to use and securely latching storage receptacle upon receipt by the customer.

A further objective of the invention is to provide such a storage/shipping container in which snap-fit latching mechanism includes a tear away strip or flap in conjunction with a closure lock, the combination of which lock the container in a closed position, and each of which are mounted on the container by a reduced thickness living hinge which allow the strip or lock to hingedly pivot from an open position into a closed position whereby the container is no longer openable absent tearing or ripping of the strip and lock from the container along the living hinges thereby allowing access to the contents of the container.

A further objective of the invention is to provide a shipping container which is tamper proof and pry-open proof absent actual damage or destruction of the container.

A further objective of the invention is to provide such a storage/shipping device which may be operated easily by the customer.

A further objective of the invention is to provide a shipper which may be manufactured by injection molding without compromising the shock dampening characteristics which a multi-media shipper must have to protect an enclosed compact disc, video cassette, audio cassette, etc.

A further objective of the invention is to provide such a storage/shipping container which may be easily manufactured as a single integral one-piece unit.

A further objective of the invention is to provide an improved multi-media shipping and storage container which can be formed relatively inexpensively as a one-piece plastic injection molded member, and which can be formed of a transparent plastic material to enable the disc label to be read through the container walls, and which is designed and formed so as to be capable of receiving a tear away lock that provides for tamper-proof shipping as well as easy transformation into a storage container.

A further objective is to provide a multi-media shipping and storage container which is molded as a compact one-piece member of a high impact lightweight polypropylene, and which protects the enclosed video cassette from damage and theft during shipment from a mail order retailer to a consumer, and which easily transforms from a shipping container into a storage container.

A further objective is to provide such a container which has a locking mechanism formed by tear-away flap which locks the container in a closed position for shipping but which is to be torn or ripped away from the shipping container allowing access to the contents enclosed therein while leaving a storage container reusable over and over for storing the multi-media contents.

A further objective is to provide such a container which has a cavity formed in a front outer wall thereof which receives the locking mechanism allowing the locking mechanism to sit flush with the front wall of the container and provide a sleek attractive appearance to the container and to prevent tampering with the locking mechanism.

Another objective of the invention is to provide such a container in which one of the flaps can be placed in a folded secured position against an end wall of the case during shipment to reduce the size of the shipping container.

Still another objective of the invention is to provide such a storage container which is of a simple, rugged and inexpensive construction, and which achieves the stated objectives in a simple, effective and efficient manner.

These objectives and advantages are obtained by the improved disc storage container of the invention, the general nature of which may be stated as including a first compartment, a second compartment, at least one hinge extending between the first and second compartments, a first tear away strip, a first living hinge, a second tear away strip, and locking means. The first compartment includes a pair of spaced side walls and an end wall. The second compartment includes a pair of spaced side walls and an end wall. The first hinge mean extends between the first and second compartments for moving said container between open and closed positions. The first tear away strip is connected to the first compartment. The first living hinge provides the connection between the first tear away strip and the first compartment. The second tear away strip is connected to the second compartment. The second living hinge provides the connection between the second tear away strip and the second compartment. The locking means interlocks the strips together whereby the first and second strips are pivotable about each its own living hinge so as to overlap one strip with the other and interlock the strips together using locking means.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

FIG. 1 is a plan view of a first embodiment of the improved multi-media storage/shipping container embodied as a compact disc storage/shipping container in full open position having a disc mounted in the base thereof;

FIG. 2 is a greatly enlarged fragmentary view of one of the circled areas shown in FIG. 1 showing the tear away strip or flap in an open position;

FIG. 3 is a view similar to FIG. 2 with the tear away strip in a closed position;

FIG. 4 is a greatly enlarged fragmentary view of the other of the encircled areas shown in FIG. 1 showing the locking tab or closure lock in an open position;

FIG. 5 is a plan view similar to FIG. 1 except for the storage/shipping container is in a closed shipping position;

FIG. 6 is a greatly enlarged sectional view of the encircled portion of FIG. 5 with the tear away strip in a closed position and the locking tab locked therein;

FIG. 9 is a plan view of a second embodiment of the improved multi-media storage/shipping container embodied as a video cassette storage/shipping container in full open position having a video cassette mounted in the base thereof;

FIG. 10 is a greatly enlarged fragmentary sectional view of the locking tab and tear away strip in an open and unlocked position;

FIG. 11 is a view similar to FIG. 10 except the locking tab is in a closed position while the tear away strip remains in an open position;

FIG. 12 is a view similar to FIGS. 10 and 11 except both the locking tab and the tear away strip are in closed position whereby the tear away strip is seated and locked within the locking tab thereby securing the contents of the container;

FIG. 13 is an end elevational view of the locking tab and tear away strip in a locked position;

FIG. 14 is a view similar to FIG. 13 except that the tear away strip with locking tab attached thereto is being torn away;

FIG. 15 is a view similar to FIGS. 13 and 14 except that the tear away strip with locking tab attached thereto has been torn away and removed such that only a storage container remains.

Similar numerals refer to similar parts throughout the drawings.

DESCRIPTION OF THE PREFERRED EMBODIMENT

Figure 7:
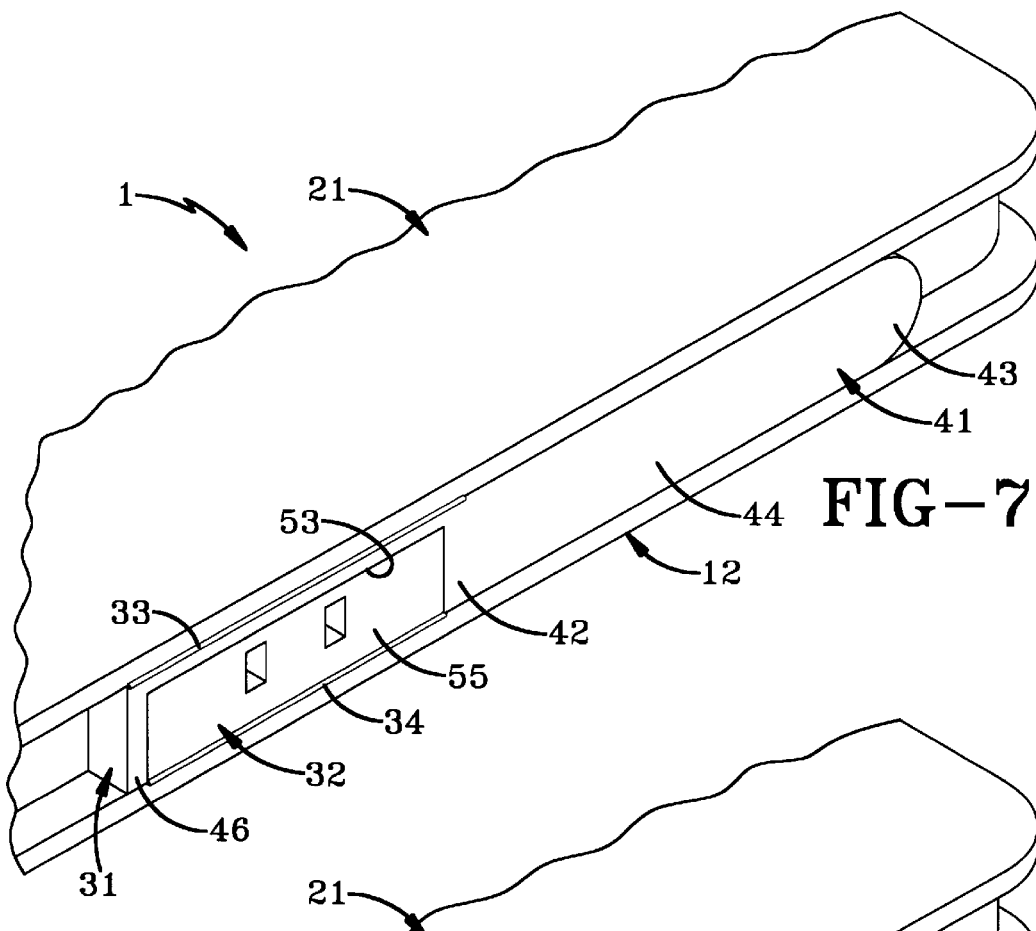
FIG. 7 is an end elevational view of the tear away strip and locking tab in a locked position as shown in FIGS. 5 and 6.

A first embodiment of the improved storage container of the invention is indicated generally at 1, and is shown in FIG. 1 in a full open position with a disc 2 shown supported therein. Disc 2 is preferably formed of a synthetic material and contains a usual center opening 3 and an outer annular peripheral edge 4 which is free of stored information. An annular surface 5 which is located between center opening 3 and edge 4 contains the recorded information. The disc will have top and bottom surfaces 6 and 7 (FIGS. 1 and 5), either one or both of which, will contain the stored information. These discs have high storage density, for an example, an optically-readable video disc or an optically-readable digital record, hereinafter referred to as a compact disc or CD.

Container 1 has a rectangular box-shaped configuration and, when closed, forms a hollow enclosure or interior storage container 10. Container 1 includes a housing indicated generally at 11, having a rectangular-shaped bottom wall or base 12 with upstanding parallel sidewalls 13 and 14 and an end wall 15, which walls are arranged in a U-shaped configuration to enclose three sides of the housing. Walls 13, 14 and 15 preferably are formed integrally with base 12 and preferably are positioned inwardly a short distance from the outer edges of base 2 to form an outer exposed U-shaped portion extending between the walls and outer edges of base 2.

A usual double hinge panel assembly 18, which includes an elongated rectangular-shaped panel 19, is connected to the inner edge of base 12 by a hinge strip 20 and to a lid 21 by a second hinge strip 22. Hinges 20 and 22 preferably are relatively thinner strips of plastic material which are integrally molded with lid 21, panel 19 and base 12, and are referred to as "living hinges". Lid 21 preferably is provided with four offset projections 24 which are spaced from the inner surface of lid 21 for receiving and holding printed materials describing the contents of disc placed in the storage container. A pair of usual latching projections 16 are formed on the free end of lid 21 and engage usual latching nubs 17 formed on end wall 15 of base 12 to latch lid 21 in a closed position.

The above described construction and features of storage container 1 are well known in the art and may be modified without affecting the invention. Many of such modifications are well known in the art of compact disc containers, often referred to as "jewel cases", and all such modified containers are readily adaptable as described below to be modified into the below described storage/shipping container.

In accordance with the invention, a latch mechanism 30 is provided for securing the lid 21 to the base 12. Latch mechanism 30 is a two part latch, namely a tear away strip 31 (FIGS. 1 and 2) and a locking tab 32 (FIGS. 1 and 4). The tear away strip 31 is preferably integrally molded to the lid 21 via a relatively thin strip of plastic material 33 which functions as a "living hinge" to allow for opening and closing of the strip with reference to the lid, and provides for a tear line when it is desirous to gain access to the contents of container after the latch mechanism has been locked as is described below. Similarly, locking tab 32 is preferably molded in an integral manner to the base 12 via a relatively thin strip of plastic material 34 which functions as a "living hinge" to allow for opening and closing of the tab with reference to the base, and provides for a tear line when it is desirous to gain access to the contents of container after the latch mechanism has been locked as is described below.

Both the tear away strip 31 and the locking tab 32 are pivotably movable with reference to the respective lid 21 and base 12 along the respective living hinge on each, whereby each of the strip and tab is hinged for up to approximately 90° or more motion.

In further accordance with the invention, the latch mechanism 30 interacts with a locking cavity 35 (FIGS. 1–6), a first portion (FIGS. 1 and 4) of which is in end wall 15 of base 12 and indicated as 35A and a second portion (FIGS. 1–3) of which is in a similar edge of lid 21 and indicated as 35B. The tear away strip 31 (FIG. 1) is alignable with the cavity 35 such that when the tear away strip 31 is closed, at least a portion of the strip seats within the cavity. In addition, when both the tear away strip 31 and the locking tab 32 are closed (FIG. 6) such that the strip 31 and tab 32 overlap, the tab seats within the strip 31 and cavity 35 as described below in more detail.

The tear away strip 31, as best shown in FIG. 1, includes a body 40 with an integral, flexible and elongated flap 41 connected thereto. The flap 41 has a proximate end 42 integral with the body 40, a distal end 43 of a rounded nature and spaced apart from the body, and a mid-section 44 therebetween whereby the overall shape of the flap 41 is rectangular with the rounded distal end. The flap 41 is hingedly and integrally connected to the lid 21 by the living hinge 33 along one edge of the flap where the living hinge is a relatively thin strip of plastic material that is thin enough to allow for tearing or ripping away of the flap along this hinge.

The body 40 of the strip 31 has an inner surface 45 and an outer surface 46 as shown in FIG. 3. The inner surface 45 includes a pair of latching projections 47 spaced apart and separated by a tab receiving hole 48 as are best shown in FIGS. 2–3. A pair of angled tabs 49 extend angularly inward from opposing edges of the hole 48 and toward each other but never in contact with each other so as to define a one way passage where a locking nub as described below on the locking tab 32 may be inserted in a first direction but may not be backed out in the opposite direction thereafter.

Each of the pair of latching projections 47 includes an outwardly extending body 50 which projects outward from the body 40 in a substantially perpendicular manner to the inner surface 45 of the body 40. At the outermost edge of the body 50 and on the outside surface of each body 50 is a locking lip 51. This locking lip 51 is of a triangular cross section in which a ramped or sloped surface projects from the outermost edge of the body 50 back toward the body 50 to a lip or ledge 52. This lip 52 extends substantially perpendicularly back to the body 50.

The outer surface 46 includes a rectangular shaped recess 53 therein as shown in FIG. 3. This recess 53 is sized so as to snuggle receive the locking tab 32. This allows the locking tab 32 to seat fully and completely within the recess 53 thereby eliminating any pry points where the latch mechanism could be forced open.

Locking tab 32, as best shown in FIGS. 4 and 6, includes a substantially planar body 55 with a "mushroom" shaped locking hub 56 outwardly projecting therefrom. This hub 56 includes a neck 57 with a head 58 of a larger cross sectional dimension or diameter than the neck resulting in a locking lip or ledge 59. The tab 32 is hingedly and integrally connected to the base 12 by the living hinge 34 along one edge of the tab where the living hinge is a relatively thin strip of plastic material that is thin enough to allow for tearing or ripping away of the tab along this hinge.

Cavity 35 as defined as a cumulation of portions 35A and 35B provides a receiver for a portion of each of the tear away strip 31 and locking tab 32 such that the strip and tab are securely locked therein. This secure locking is achieved by a pair of opposed locking ridges 60 molded into at least the portion 35B. These ridges serve to receive locking lip 51 of latching projection 47.

In operation, a disc 2 is inserted within the container 1 as is shown in FIG. 1 whereby the center opening 3 in the disc 2 seats on a center post in the base of the container 1 as is well known in the art. The container is then closed which means the lid 21 is pivoted 180° about the double living hinges 20 and 22 such that lid 21 seats within or abuts to base 12 as is well known in the art.

In accordance with one of the features of the invention, tear away strip 31 is pivoted 90° inward toward cavity 35 about living hinge 33 such that locking lip 51 on latching projection 47 seats within cavity 35 whereby the lip 51 rides over and locking ridges 60 and snap locks therein. Specifically, the locking lips flex inward to pass between the locking ridges whereafter the lips snap back to its original shape in which the opposing ledges 52 snap outward and fit underneath locking ridges 60 (and are thus no longer removable from the cavity 35). This pivoting and seating of the tear away strip is best shown in sequence in FIGS. 2 and 3.

In accordance with another of the features of the invention, the locking tab 32 is similarly pivoted 90° inward toward cavity 35 about living hinge 34 such that the tab overlaps the tear away strip 31 and the locking hub 56 extends into tab receiving hole 48. The mushroom head 58 forces the pair of angled tabs 49 outward so as to allow the hub to pass therebetween. However, once the lip 59 of the hub has passed, the angled tabs snap back and engage the locking lip 59 thereby prohibiting withdrawal of the hub from the hole 48 thereafter. This tab engaging step is shown in FIGS. 4 and 6.

The compact disc is now securely stored in the protected environment of the container 1, it is a shipping container that is storing the compact disc. The container 1 is then shipped to a purchaser. Once the purchaser receives the container, the purchaser determines if it is the correct compact disc, that is one having the ordered contents, by reading the labels that are apparent through the plastic material that the container is made of (typically a plastic such as polypropylene which is hard, shatter resistance, easily molded, and transparent). If the content is incorrect, then the customer may return the container 1 as is whereby the seller receives back an un-opened and for all purposes "new" compact disc.

Figure 8:
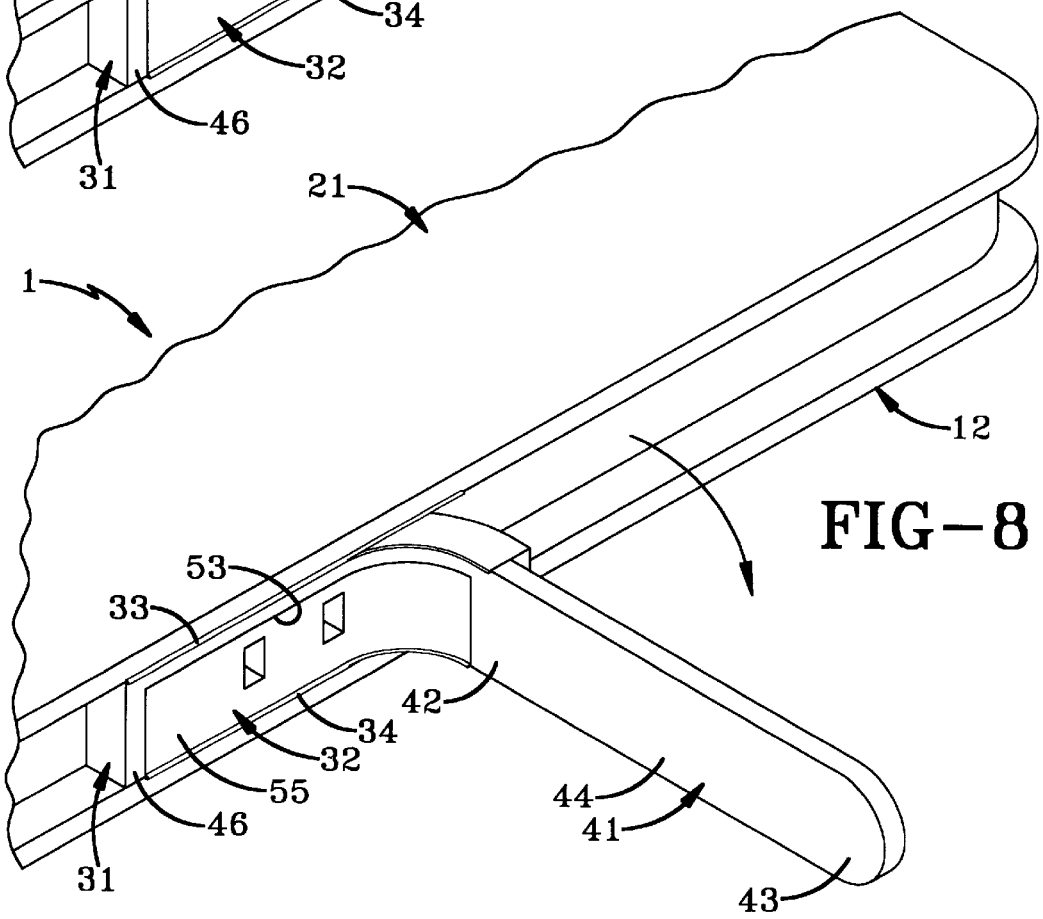
FIG. 8 is a view similar to FIG. 7 except the tear away strip with locking tab seated therein is being torn away from the container thereby allowing access to the contents and transforming the container from a shipping container into a storage container.

However, typically, the content will be correct and the user is then free to open the container 1. This is performed by grasping the flap 41 and pulling the flap resulting in a tearing or ripping of the tear away strip 31 and the locking tab 32 from the container 1. This is best shown sequentially on FIGS. 7 and 8. The tear away strip 31 and locking tab 32 rip along the living hinges 33 and 34 respectively resulting in the entire locked assembly of strip 31 and tab 32 being removed. The container is no longer a shipping container, but instead a storage container if a substantially equivalent structure to the current jewel cases used for storing compact discs. The purchaser now has a storage container for the newly purchased compact disc where the storage container can be used over and over again.

Obviously, this technology is equally applicable to other multi-media such as audio cassettes, video cassettes, etc. Another embodiment to display such adaptability is shown in FIGS. 9–15 on a video cassette container. Specifically, a second embodiment of the improved storage container of the invention is indicated generally at 100, and is shown in FIG.

9 in a full open position with a video cassette 102 shown supported therein (the video cassette embodied as a VHS tape).

The video cassette shipping container of the second embodiment as is shown in FIG. 9 in an open position and indicated generally at 100, has a rectangular box-shaped configuration and preferably is molded as a one-piece member of a plastic material, such as a high impact polypropylene. Container 100 includes a first compartment or base indicated generally at 104 hingedly connected to a second compartment or lid indicated generally at 106. Base 104 has a bottom wall 108 with upstanding parallel side walls 109 and front and rear end walls 110 and 111, respectively. Walls 109–111 are formed integrally with bottom wall 108 whereby the wall 108 forms an outer rounded edge 112 with walls 109–111 offset slightly therein from edge 112. Side walls 109 are formed integrally with front and rear end walls 110 and 111, respectively, and generally forming outer rounded corners 113 therebetween.

Lid 106 includes a flat rectangular-shaped top closure wall 114, similar in size and configuration to bottom wall 108, along with upstanding parallel side walls 115 and front wall 116 (although a rear wall may also be molded therein). Walls 115–116 are formed integrally with closure wall 114 whereby wall 114 forms an outer rounded edge 118 with walls 115–116 offset slightly therein from edge 118, and side walls 115 are formed integrally with front wall 116, generally forming outer rounded corners 119 therebetween. The rounded corners and edges allow for a smoother more user-friendly package while the offsets provide lips for grasping and opening the container. The smooth or rounded corners and edges still provide sufficient support for standing the container on its side or end.

A hinge assembly indicated generally at 120 extends between base 104 and lid 106 and includes a rectangular-shaped hinge panel 121 connected between base 104 and lid 106 by living hinges 122 and 123, respectively. Living hinge 122 is formed integrally with rear wall 111 of base 104 and extends outwardly from an outer surface thereof and living hinge 123 is formed integrally with lid 106. A plurality of ribs 126 extend inwardly from the inner surface of walls 109–111 of base 104 for centrally positioning a usual VHS tape 128 within base 104 as shown in FIG. 9.

Both bottom wall 108 of base 104 and top closure wall 114 of lid 106 extend substantially perpendicularly between the walls 109–111 and 115–116, respectively, and in addition extend outward beyond the walls 109–111 and 115–116, respectively, as is shown in FIGS. 10–15. In effect, this extending beyond the walls defines a channel 130. This extension of the walls defines a square end which provides for ease of standing the container 100. In addition, this channel 130 provides for easy opening of the container when used as a storage container since each of the overhanging base and wall provides a lip for pulling open the container.

In accordance with one of the features of the second embodiment of the invention, container 100 may in addition be used as a shipping container prior to use as a storage container. This additional use is available due to a locking mechanism which is indicated generally at 134 (FIG. 13). Locking mechanism 134 includes a pair of flexible flaps 136 and 138 hingedly mounted to base 104 and lid 106, respectively, by reduced thickness living hinges 140 and 142, respectively (FIGS. 9–12). Flaps 136 and 138 are formed of the same plastic material as base 104, lid 106 and hinge assembly 120, and the relatively thin construction thereof allows the flaps to bend and flex when locking mechanism 134 is removed from container 1, as described further below. Living hinges 140 and 142 mount flaps 136 and 138, respectively, to outer edges of bottom wall 108 and top closure wall 114, respectively, and extend into and across channel 130 to form a continuous smooth, substantially flat end wall to the container when both of the flaps 136 and 138 are folded into the locked shipping position as shown in FIGS. 12–13.

Flap 136 hingedly extends from base 104 along a portion of the length of base 104. Flap 136 includes a plurality of hub receiving holes 150 where each hole is funnel shaped as best shown in FIGS. 10–11. Each of the holes 150 includes a pair of ribs 152 adjacent thereto which provide strength and serve as a stop. Flap 136 is only approximately one-half of the height of the container 100 as is best shown in FIGS. 10–11, although flap 136 includes a pair of guide tabs 154 which extend further outward and are often slightly curved as is shown in FIGS. 10–12 (or in the opposite direction outward from wall 110 rather than inward toward wall 110).

Flap 138 hingedly extends from lid 106 along substantially the entire length of the lid 106. Flap 138 includes a plurality of locking hubs 160 along a portion of the length of the flap 138, a portion corresponding to the length of flap 136. Each of the hubs 160 is approximately alignable with one of the holes 150 in the base 104. Each hub 160 is generally of a "mushroom" shape, that is having a cylindrical neck with a semi-circular head of a larger cross dimension whereby the rounded nature of the top of the head assists in insertion of the hub into a hole while the thinner neck supplies a locking ridge between the head and neck for holding the hub in once inserted. The flap 138 also includes a pull flap portion 162 at one end.

In operation, a VHS tape 128 is placed within base 104 and is centered therein by ribs 126 as shown in FIG. 9. Flaps 136 and 138 of base 104 and lid 106, respectively, are pivoted to an upright or perpendicular position in relation to walls 108 and 114, respectively. Specifically, flap 136 is closed first as is sequentially shown from FIGS. 10 to 11, and then flap 138 follows as is sequentially shown from FIGS. 11 to 12 whereby hubs 160 are forced into holes 150 and guided by the funnel shape. The hubs 160 snap through the holes 150 and are secured therein as the locking ridge 163 prohibits removal of the hub 160 from the hole 150. As a result, a smooth outer surface to the front wall of the container is created thereby providing a sleek attractive design to container 100 when container 100 is in the locked shipping position.

Container 100 is shipped to the address listed on a shipping label somewhere thereon of easy viewing, and upon receipt of container 100, the recipient or user opens container 100 by tearing or ripping the entire lock mechanism (flaps 136 and 138) from the container 100 whereby the ripping occurs along the living hinges 122 and 123 as these are the most thin areas. The tearing or ripping is initiated by grasping the pull flap portion 162 and yanking or pulling as is shown in FIG. 14. Basically, the reduced thickness living hinges 140 and 142 are torn or ripped from their integral connection with base 104 and lid 106, respectively, as the flaps flex. The user continues to pull until flaps 136 and 138 have been completely torn from container 100 (FIG. 15) and discarded. The user's thumbs or fingers are inserted within the area the flaps previously filled, that is, the channel 130 area along end walls 110 and 116 as is shown in FIGS. 10–12 with flaps therein and in FIG. 15 with the flaps removed, and lid 106 is pried away from base 104 easily opening container 100 and exposing enclosed VHS tape 128 for removal and viewing thereof. Shipping label 164 can be removed from container 100 by the purchaser and the container forms a usual VHS storage container which protects the VHS tape 128 from dust, debris and damage during everyday use by the user.

In summary, container 100 is molded in as a one-piece member of a lightweight inexpensive plastic material. Living hinges 122 and 123 allow base 104 and lid 106, respectively, to pivot toward one another when container 100 is placed in the closed position, and living hinges 140 and 142 allow flaps 136 and 138, respectively, to pivot 90° when container 100 is placed in the locked position. The hubs 160 snap through holes 150 and cannot be withdrawn resulting in the flap 138 being permanently secured to the flap 136 thereby prohibiting opening of the container 100. The locking mechanism 134 (flaps 136 and 138) is torn from container 100 for the user to gain access to VHS tape 128. The reduced thickness of living hinges 140 and 142 allow flaps 136 and 138 of locking mechanism 134 to be easily torn from container 100 providing a usual VHS video cassette storage container.

Container 100 could be used to ship other items such as audio cassettes, compact discs, video games or other articles without effecting the concept of the invention by molding container 100 to correspond to the respective size of the item to be shipped and subsequently stored therein.

Figure 16:
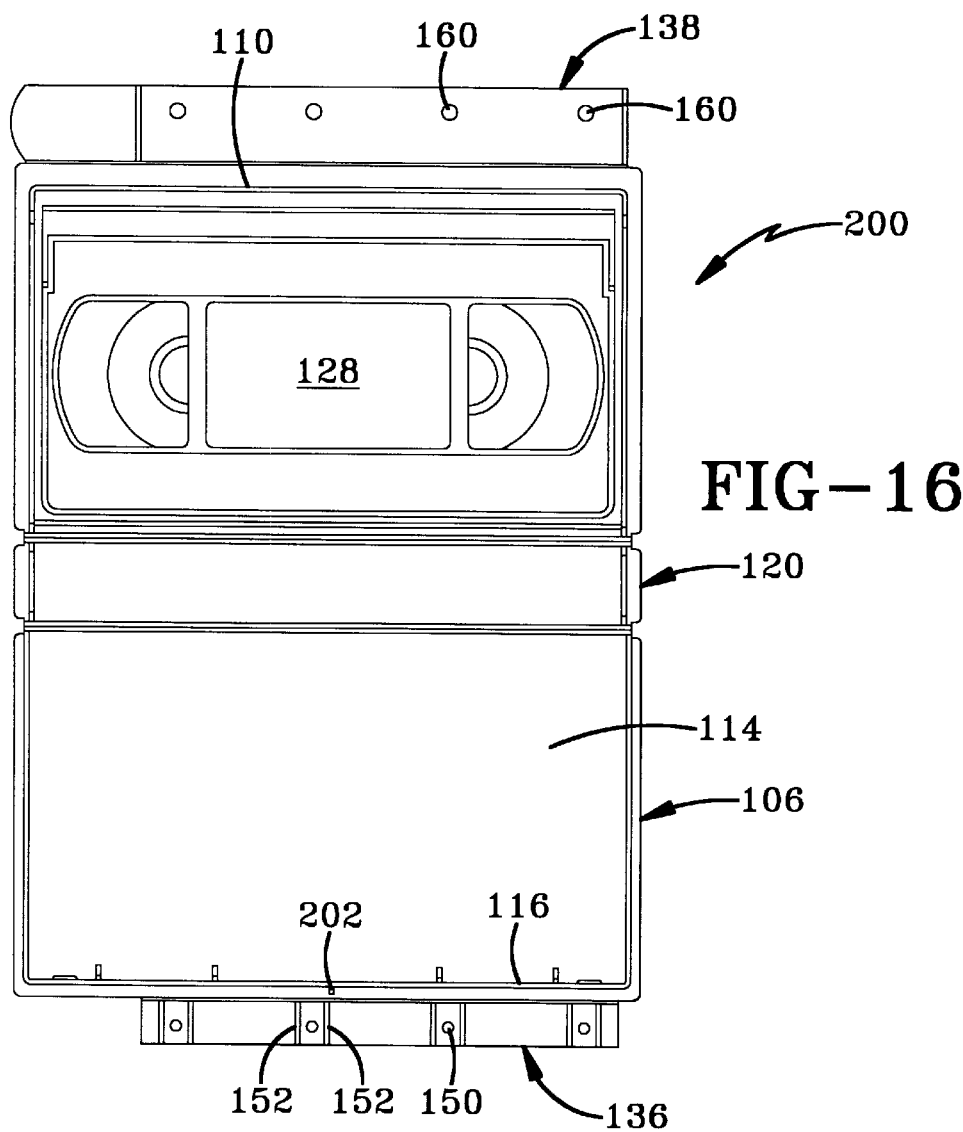
FIG. 16 is a view similar to FIG. 9 of another embodiment of the improved container.
Figure 17:
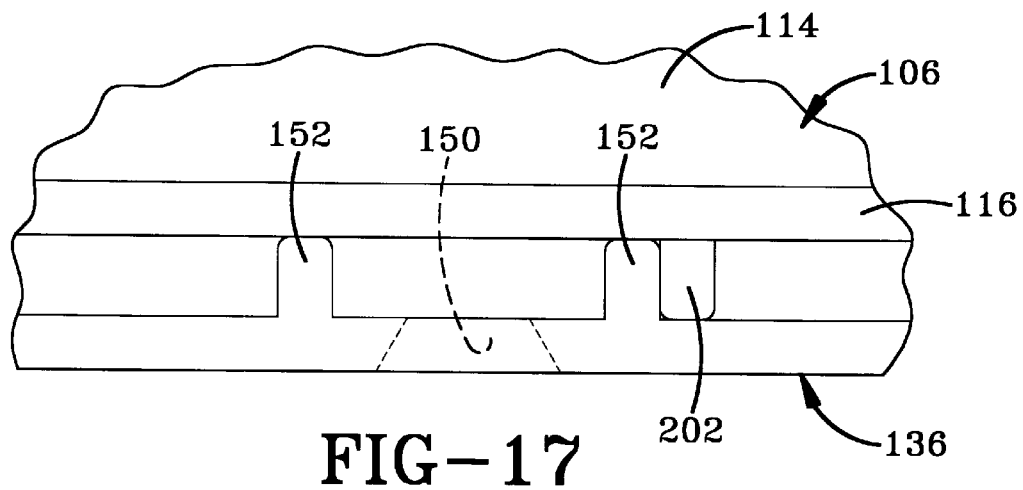
FIG. 17 is an enlarged fragmentary top plan view showing one of the strips in a folded latched shipping position.

A further modified container indicated generally at 200, is shown in FIG. 16 and is similar in nearly all respects to that of container 100 shown in FIGS. 9–15. The main difference is that strips 138 and 136 are reversed, that is, strip 138, which includes locking projections 160, is formed along adjacent end wall 110 of the storage compartment in which the VHS cassette 128 is stored, with flap 136 being formed adjacent end wall 116 of lid 106. One other modification is that guide strips 154 are removed from flap 136.

Another difference is that a latching rib 202 is formed on end wall 116 and extends partially therealong. Rib 202 forms a snap-fit latching engagement with one of the ribs 152 of strip 136 when strip 156 is in a folded position. This enables flap 136 to be shipped in a folded position along end wall 116 which reduces the size of the shipping container an amount generally equal to the width of strip 136. Likewise, strip 136 is already in its locked position for receiving projections 160 of strip 138 after the cassette has been placed within the container and lid 106 moved to its closed and subsequent locked position.

Accordingly, the improved container provides a construction which is effective, safe, inexpensive, efficient in assembly, operation and use and which achieves all of the enumerated objectives, provides for eliminating difficulties in prior disc and cassette storage containers and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved disc or cassette storage container is constructed and used, the characteristics of the construction, and the advantageous, new and useful results obtained; the new and useful structures, devices, elements, arrangements, parts and combinations, are set forth in the appended claims.

We claim:

1. A container for shipping and storing objects, said container including:
   a first compartment which includes a base wall with a pair of spaced sidewalls and an end wall extending therefrom;
   a second compartment which includes a base wall with a pair of spaced sidewalls and an end wall extending therefrom;
   at least one hinge extending between the first and second compartments for moving said container between open and closed positions;
   a locking cavity defined within the end walls of at least one of the first and second compartments;
   a tear away strip hingedly connected to the first compartment in a pivotable manner from an open position to a closed position, the strip including first latching means engageable with the locking cavity and a tab receiver; and
   a locking tab hingedly connected to the second compartment in a pivotable manner from an open position to a closed position whereby said closed position involves the locking tab overlapping the tear away strip, the locking tab including second latching means engageable with the tab receiver for securing the first and second compartments together.

2. The container defined in claim 1 in which the locking cavity includes at least one locking ridge for engaging the first latching means.

3. The container defined in claim 2 in which the first latching means includes at least one latch body having a locking lip thereon for engaging the locking ridge.

4. The container defined in claim 3 in which the tab receiver is a hole within the tear away strip for receiving the second latching means.

5. The container defined in claim 4 in which the second latching means includes at least one locking projection having a head extending from the locking tab with a neck therebetween, the neck having a narrower cross dimension than the locking projection thereby defining a locking lip for engaging the hole.

6. The container defined in claim 1 wherein the locking tab overlaps the tear away strip during latching of the first compartment to the second compartment.

7. The container defined in claim 1 in which the tear away strip and the locking tab are each hingedly connected to the first and second compartments respectively by a reduced thickness living hinge.

8. The container defined in claim 1 in which the strip and tab are formed of a thin flexible plastic.

9. A container for shipping and storing objects, said container including:
   a first compartment which includes a plurality of walls;
   a second compartment which includes a plurality of walls;
   first hinge means extending between the first and second compartments for moving said container between open and closed positions;
   a first tear away strip connected to the first compartment;
   a first hinge providing the connection between the first tear away strip and the first compartment;
   a second tear away strip connected to the second compartment;
   a second hinge providing connection between the second tear away strip and the second compartment;
   locking means for interlocking the strips together, whereby the first and second strips being pivotable about the hinges so as to overlap one strip with the other and interlock the strips together using the locking means when the container is in the closed position; and latch means formed on one of the walls of one of the compartments for securing the adjacent one of the strips in a pivotable overlap position prior to being overlapped by the other one of said strips.

10. The container defined in claim 9 in which the latch means includes a first rib formed on an end wall of said one compartment and a mating second rib formed on said one strip which snap fits with said first rib.

11. A container for shipping and storing objects, said container including:

a first compartment which includes a plurality of walls;

a second compartment which includes a plurality of walls;

first hinge means extending between the first and second compartments for moving said container between open and closed positions;

a first tear away strip connected to the first compartment;

a first hinge providing the connection between the first tear away strip and the first compartment;

a second tear away strip connected to the second compartment;

a second hinge providing connection between the second tear away strip and the second compartment;

locking means for interlocking the strips together, whereby the first and second strips being pivotable about the hinges so as to overlap one strip with the other and interlock the strips together using the locking means when the container is in the closed position;

the locking means being defined as the first strip including at least one locking projection and the second strip including at least one projection receiver;

the locking means being further defined as at least one of the first and second compartments including a locking cavity for receiving a second locking projection defined in the second strip with the at least one projection receiver therein which receives the at least one locking projection.

12. The container defined in claim 11 in which the at least one locking projection is seatable within the at least one projection receiver when said container is in the closed position and the strips are overlapped.

\* \* \* \* \*